(12) United States Patent
Schloss et al.

(10) Patent No.: US 7,077,564 B2
(45) Date of Patent: Jul. 18, 2006

(54) LASER POWER METER

(75) Inventors: James Schloss, Tigard, OR (US); Sidney E. Levingston, Aloha, OR (US); Sean Bergman, Sherwood, OR (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/857,584

(22) Filed: May 28, 2004

(65) Prior Publication Data

US 2005/0018178 A1 Jan. 27, 2005

Related U.S. Application Data

(60) Provisional application No. 60/479,526, filed on Jun. 18, 2003.

(51) Int. Cl.
*G01K 17/20* (2006.01)

(52) U.S. Cl. ............................................. 374/32; 374/45

(58) Field of Classification Search ................. 374/31, 374/32, 45; 250/338.1
See application file for complete search history.

(56) References Cited

U.S. PATENT DOCUMENTS

| | | | | |
|---|---|---|---|---|
| 4,413,916 A | * | 11/1983 | Seguin | 374/32 |
| 4,865,446 A | * | 9/1989 | Inoue et al. | 374/32 |
| 4,964,735 A | * | 10/1990 | Sasnett et al. | 374/32 |
| 5,156,459 A | * | 10/1992 | Baker et al. | 374/32 |
| 5,209,567 A | * | 5/1993 | Loosen et al. | 374/32 |
| 5,316,380 A | | 5/1994 | Secemski | 374/32 |
| 6,025,587 A | * | 2/2000 | Stucchi et al. | 374/32 |
| 2003/0012252 A1 | * | 1/2003 | Bender | 374/32 |

OTHER PUBLICATIONS

E.D. West et al., "Theory of Isoperibol Calorimetry for Laser Power and Energy Measurements," *Journal of Applied Physics*, vol. 41, No. 6, May 1970, pp. 2705-2712.

T.R. Scott, "Theory of Isoperibol Calorimetry for Laser Power and Energy Measurement," *A Century of Excellence in Measurements, Standards, and Technology*, A Chronicle of Selected NBS/NIST Publications, 1901-2000, NIST Special Publication 958, David R. Lide, Editor, Jan. 2001, pp. coversheet through Table of Contents [17 pages in length], and 178-180.

* cited by examiner

*Primary Examiner*—G. Bradley Bennett
(74) *Attorney, Agent, or Firm*—Stallman & Pollock LLP

(57) ABSTRACT

A laser power meter and associated method are disclosed. The laser power meter has an absorber that is placed in a path of a laser beam during a power measurement, a temperature sensor for measuring the temperature of the absorber, a differentiator for determining a rate of change of the temperature of the absorber, and a processor that computes an estimated power of the laser beam based on the temperature and its rate of change without considering power related loss effects and then computes the power of the laser beam based on the estimated power and the temperature and its rate of change.

13 Claims, 6 Drawing Sheets

LASER POWER METER

RELATED APPLICATION

The present application claims the benefit of priority to U.S. Provisional Application No. 60/479,526, filed Jun. 18, 2003.

BACKGROUND OF THE INVENTION

1. Field of the Invention

This invention relates generally to methods and apparatus for measuring the power of a laser, and relates more particularly to a laser power meter having an absorber mass and a circuit that monitors the temperature of the absorber mass and compensates for convection losses during a power test.

2. Description of the Relevant Art

One way to measure power or energy in a laser beam is to expose a mass to the laser beam and measure the amount of heat absorbed by the mass over a period of time. The mass absorbs incident laser radiation and converts the optical energy of the laser beam into heat. This heat ultimately flows to a heat sink that is held at a near constant ambient temperature by either air or water cooling. The temperature difference between the absorber mass and heat sink is converted into an electrical signal by a temperature sensor, such as a thermocouple or thermistor. In order to obtain a measurable temperature difference between the temperature sensor and the heat sink, the device is designed for controlled thermal resistance between the two.

Standardized calibration measurements have been made for lasers using isoperibol calorimeters to measure laser power or energy. An isoperibol calorimeter is one in which an absorbing cavity is surrounded by a constant temperature environment. The laser beam heats the absorbing cavity and temperature sensors determine the resultant thermal rise. Isoperibol calorimeters account for radiation and conduction of the absorbed heat, but are constructed to minimize and ignore heat losses by convection.

U.S. Pat. No. 5,316,380 discloses a laser power meter with an energy absorbing mass, a device for measuring the change in temperature of the absorber, and an electronic timer. The electronic timer defines a period of time over which a change in temperature of the absorber is measured. A disadvantage of this type of power meter is that it ignores convection losses from the absorber. To compensate for this shortcoming, the absorber needs to start at room temperature in order to obtain accurate and consistent readings. Starting a measurement with the absorber at an elevated temperature would introduce a source or error due to the temperature dependence of convection losses.

SUMMARY OF THE INVENTION

In summary, the present invention is a process and apparatus for measuring power or energy in a laser beam. The present invention includes a method for measuring laser power with a meter having an absorber located in a path of a laser beam, including steps of monitoring the temperature and the rate of change of temperature of the absorber as the laser beam heats it up, computing an estimated power of the laser beam based on the monitored temperature and the rate of change of temperature of the absorber without considering power related loss effects, and computing the power of the laser beam based on the estimated power determined in the previous step and the temperature and the rate of change of temperature of the absorber.

The present invention also includes a laser power meter having an absorber that is placed in a path of a laser beam during a power measurement, a temperature sensor for measuring the temperature of the absorber, a differentiator for determining a rate of change of the temperature of the absorber, and a processor, that computes an estimated power of the laser beam based on the temperature and its rate of change without considering power related loss effects and then computes the power of the laser beam based on the estimated power and the temperature and its rate of change.

The estimated power of the laser beam, $P_{est}$, is preferably calculated according to the formula $P_{est}=A \cdot dT/dt+[B0 \cdot T]^{B2}$, where T is the temperature of the absorber, dT/dt is the rate of change of temperature of the absorber, A is a sensitivity coefficient near room temperature, and B0 and B2 are loss coefficients not related to power. The power of the laser beam, P, is preferably calculated according to the formula $$P=A \cdot dT/dt+[(B0+B1 \cdot P_{est})T]^{(B2+B3 \cdot P_{est})}, \text{ where B1 and}$$
B3 are power related loss coefficients.

Another aspect of the present invention is a low cost, laser power meter. Different configurations of this laser power meter can be used to measure laser power preferably within (but not limited to) the range of 10 W to 10 kW. Each configuration can accurately measure laser power over a dynamic range of at least ten times (i.e., a 100 W detector will measure between 10 W–100 W). Unlike other power meters, multiple measurement of laser power can be made with the present invention without first cooling the absorber to room temperature. This feature is due to a mathematical algorithm that corrects for heat loss due to convection. Multiple measurements can be taken until the absorber reaches its maximum operating temperature, which is preferably about 150° C. A calibration algorithm is used that computes the variation in convection with laser power and temperature. This calibration routine dramatically increases the accuracy of the power meter when taking multiple measurements. Without the calibration algorithm, measurement error would increase dramatically with absorber temperature. Also, the present invention computes and averages instantaneous power, rather than measuring the total temperature change in an absorber over a timed interval like other power meters.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
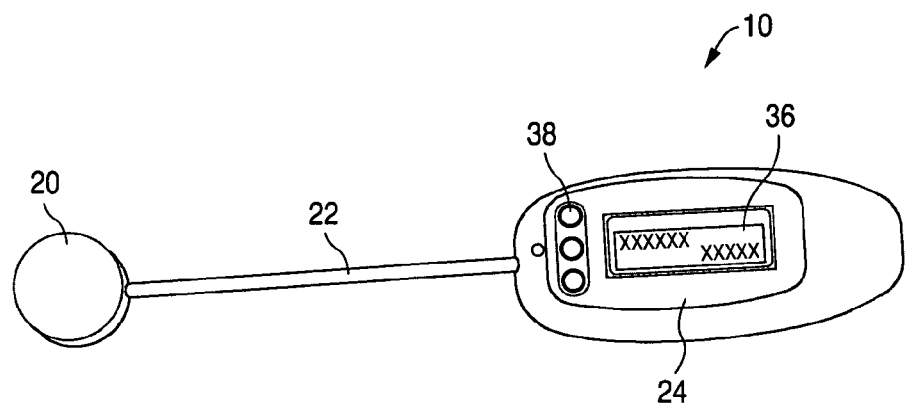
FIG. 1 is a perspective view of a laser power meter according to the present invention.

Shown in FIG. 1, the laser power meter 10 of the present invention has three main parts; an absorber 20, a stainless steel stem 22, and a computation and readout unit 24.

Figure 3:
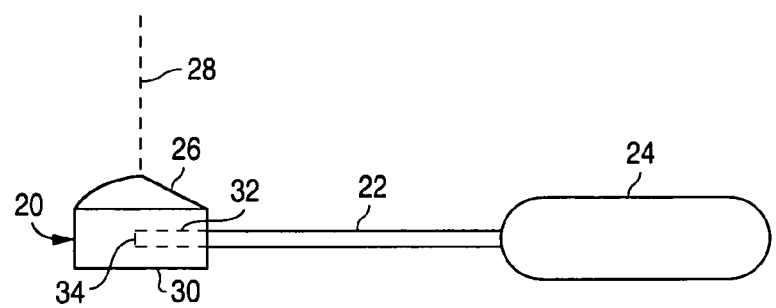
FIG. 3 is a side view of the laser power meter of the present invention.

The absorber 20 is a mass of a thermally-conductive material, such as copper or aluminum, that is coated with a material that is resistant to laser damage. As best shown in FIG. 3, the absorber shape is preferably a cone with a rounded apex joined to a short cylinder. The absorber 20 has a conical portion 26 that is oriented toward the laser beam 28, plus a cylindrical portion 30 opposite the laser beam. The laser beam impinges on the rounded apex of the cone. The thermally-conductive material of the absorber 20 is preferably aluminum or copper, or other equivalent material. The coating material can be alumina (aluminum oxide), a mixture of alumina and titania (titanium dioxide), chromia (chromium dioxide), silicon carbide, boron carbide, or an equivalent material. The mass of the absorber 20 is preferably chosen to give a 10° C./sec temperature rise at the maximum laser power.

The absorber 20 has a hole 32 drilled into its center. A thermocouple 34 is cemented into this hole. The temperature rise of the absorber 20 produced by the incident laser beam 28 is measured by this thermocouple 34 to determine the power of the laser beam.

The stainless steel stem 22 connects the absorber 20 to the computation and readout unit 24. The stem 22 also protects a thermocouple wire that runs inside the stem from the absorber to a circuit board in the computation and readout unit 24. The low thermal conductivity of stainless steel and the thin wall of the tubing reduce the heat conduction out of the absorber 20 to the stem 22. Excessive heat loss from the absorber 20 to the stem 22 would reduce measurement accuracy, so it is beneficial to reduce conductive heat loss.

The stem 22 is bonded to the hole 32 in the absorber 20 with an inorganic ceramic adhesive. This adhesive both mechanically bonds the stem 22 and absorber 20 and fills the hole 32 around the thermocouple 34. The adhesive should preferably be free of voids and capable of withstanding extreme thermal shocks. In an extreme over temperature situation, the adhesive may have to withstand ~500° C. or more. For this reason organic epoxies should not be used for bonding the stem to the absorber. Preferably, the adhesive is either Aremco 561 or Cotronics Resbond 940fine.

The computation and readout unit 24 contains an LCD display 36, microprocessor-based measurement electronics, and a three button user interface 38 (FIG. 1). All the electronics are preferably contained on a common circuit board. The circuit board is mounted on a steel frame that is welded to the stem 22. There are two sensor inputs to the readout unit, the thermocouple signal from the absorber and an ambient temperature sensor (LM45B) on the computation and readout unit circuit board. These sensor signals are used to compute the laser power.

Theory of Operation

In the present invention, the absorber 20 is thermally connected to a thermocouple 34. When the absorber 20 is placed in the path of a laser beam 28, its temperature will rise with respect to time. The power in the beam 28 is proportional to the temperature rise measured by the thermocouple and is given by:

$$\text{Power} = \rho \cdot V \cdot s \cdot dT/dt + P_{conv}$$

where V=absorber volume, $\rho$=absorber density, s=absorber specific heat, dT/dt=time derivative of the absorber temperature, and $P_{conv}$=the power loss from the absorber's surface due to convection heat transfer.

At a constant power of the incident laser beam 28, the heating rate (dT/dt) of the absorber 20 is inversely proportional to the mass of the absorber. The mass of the absorber is chosen to give a dT/dt of 10° C./sec at the maximum rated laser power. Therefore the absorber 20 for a 3 kW laser power meter 10 is thirty times more massive than an absorber for a 100 W laser power meter. Heat is lost from the surface of the absorber due to convection. Experimentally it has been shown that the power loss due to convection ($P_{conv}$) depends on both the absorber temperature and on laser power. The convection loss is non-linear, so it significantly complicates the equation for computing laser power. If the stem 22 connecting the absorber 20 to the readout unit 24 were highly thermally conductive, there would be an additional loss term due to heat conduction through the stem. However, the thin walled stainless steel tube design of the stem 22 limits this heat conduction loss.

During a laser power measurement, analog circuitry in the computation and readout unit 24 provides both the absorber temperature (T) and the time derivative of the temperature (dT/dt). The absorber temperature is measured by the thermocouple 34 that is cemented into the center of the absorber 20. Laser power (P) is computed from real time data, by a microprocessor, from the following equations:

$$P = A \cdot dT/dt + [(B0 + B1 \cdot P_{est})T]^{(B2 + B3 \cdot P_{est})} \quad \text{equation (1.0)}$$

$$\text{where } P_{est} = A \cdot dT/dt + [B0 \cdot T]^{B2} \quad \text{equation (1.1)}$$

and A, B0, B1, B2, and B3 are calibration constants.

Since the convective loss depends on laser power in addition to temperature, it is necessary to first estimate the laser power using equation (1.1), which ignores the power related loss effects. This power estimate is then used to compute a final power value, including both temperature and power dependent losses, by equation (1.0). These equations can be used as an iterative sequence to further improve accuracy. Preferably, the present invention uses only one application of the equations.

Each time the laser power meter is triggered by the user, the average of 64 power calculations is used to produce the displayed power measurement.

Electrical Circuit

Figure 2:
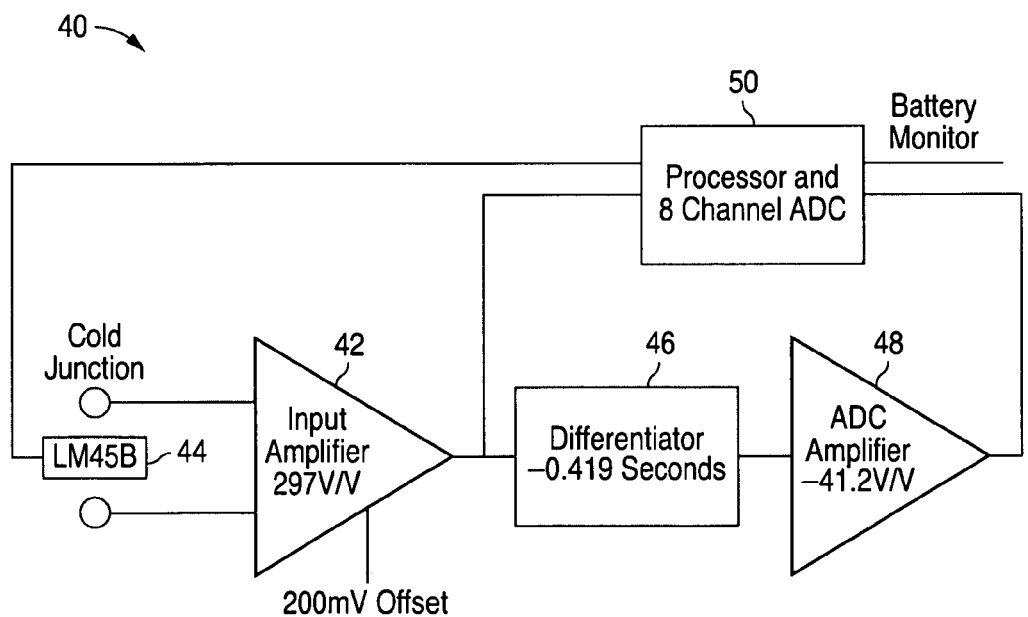
FIG. 2 is a block diagram of an electronic circuit incorporated into the laser power meter of the present invention.

An electrical circuit 40 in the computation and readout unit 24 is shown in block diagram form in FIG. 2. The circuit 40 includes an input amplifier 42, a temperature sensor 44, a differentiator 46, and an amplifier 48, which supply inputs to drive an analog to digital converter (ADC) and processor 50. The ADC is a multi-channel device embedded in the processor. The output of the input amplifier 42 is measured to provide a temperature differential between the thermal absorber 20 and the instrument circuit board. The absorber 20 contains the hot junction of the thermocouple 34, and the circuit board contains the cold junction of the thermocouple. To facilitate absolute temperature measurement, and accurate power measurements, the temperature of the cold junction needs to be known. An LM45B temperature measurement IC is used as the temperature sensor 44. The IC is placed between the cold junction attachment points on the circuit board. The differentiator 46 measures the slope of the absorber temperature, and its output is amplified by the amplifier 48 and input to the processor 50 through an on-board ADC. Thus, the processor 50 receives three inputs—the ambient temperature (from the LM45B temperature sensor 44), the absorber temperature (from the input amplifier 42 and thermocouple 34), and the instantaneous rate of change of the absorber temperature (dT/dt, from the differentiator 46 and amplifier 48).

Calibration Algorithm

Figure 4:
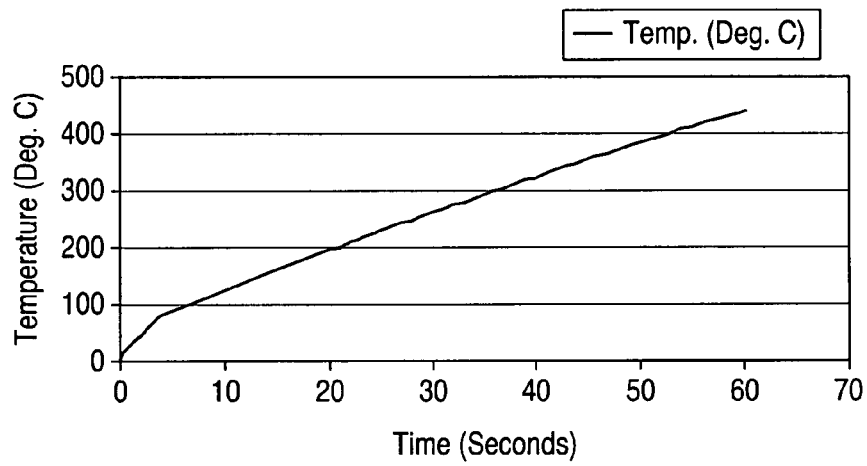
FIG. 4 is a graph of absorber temperature and time for the laser power meter of the present invention.
Figure 5:
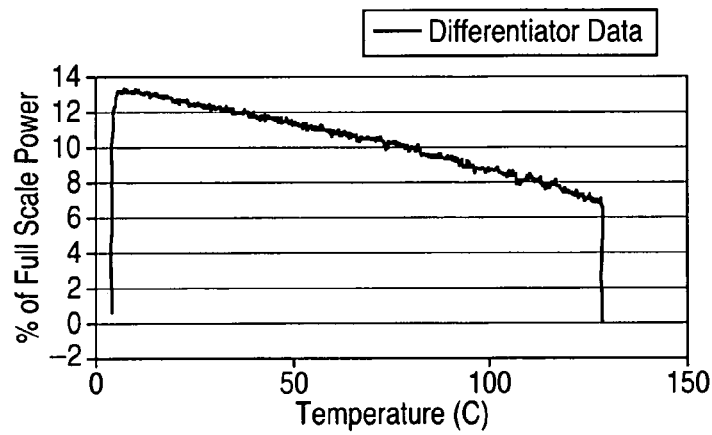
FIG. 5 is a graph of differentiator data and absorber temperature for the laser power meter of the present invention exposed to a low power laser beam.

When the laser power meter is exposed to a laser beam, the thermocouple signal is non-linear, as shown in FIG. 4. There is an initial steep rise in the first few seconds, and then the ramp has a slight decrease in slope as time increases. This non-linearity is due to convective losses. As a result, the differentiator signal is not a constant, but falls with increasing temperature in the absorber. FIG. 5 shows the differentiator signal plotted against absorber temperature when exposed to a low-power laser beam rated at 13% of full-scale power.

Figure 6:
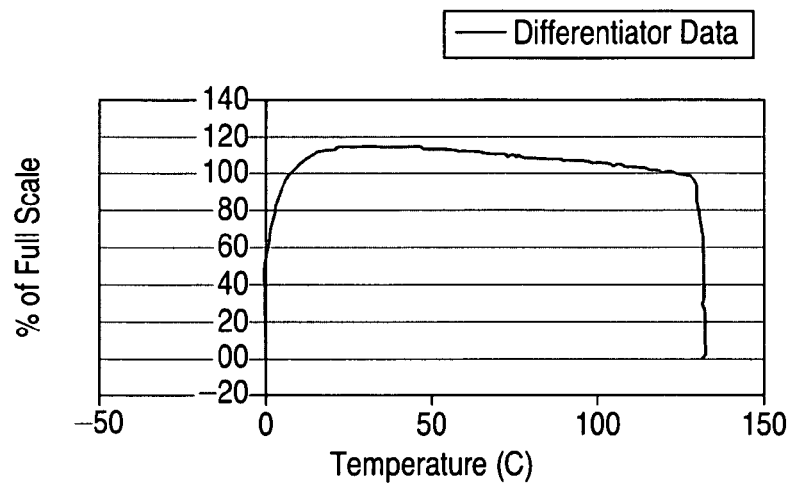
FIG. 6 is a graph of differentiator data and absorber temperature for the laser power meter of the present invention exposed to a high power laser beam.

If the laser power is calculated simply from the differentiator data, the result will vary due to convective losses as the absorber temperature increases, even though the power in the beam is not varying. To further complicate matters, the amount of non-linearity in the differentiator signal is also a function of power. This is shown in FIG. 6, which is a plot of the differentiator signal versus absorber temperature when exposed to a high-power laser beam rated at 118% of full-scale power.

To find the power in the beam, the temperature of the absorber and the power being measured must be known. Since the power being measured cannot be known before it is calculated, the measurement routine of the present invention first estimates the power without considering power related loss effects, then uses the estimated power to calculate and display the final measured power. The calibration must find the probe sensitivity coefficient, A (the response coefficient near room temperature when convection effects can be ignored), as well as the loss coefficients, B0, B1, B2, and B3 (of which B1 and B3 are power related, as explained below).

Figure 7:
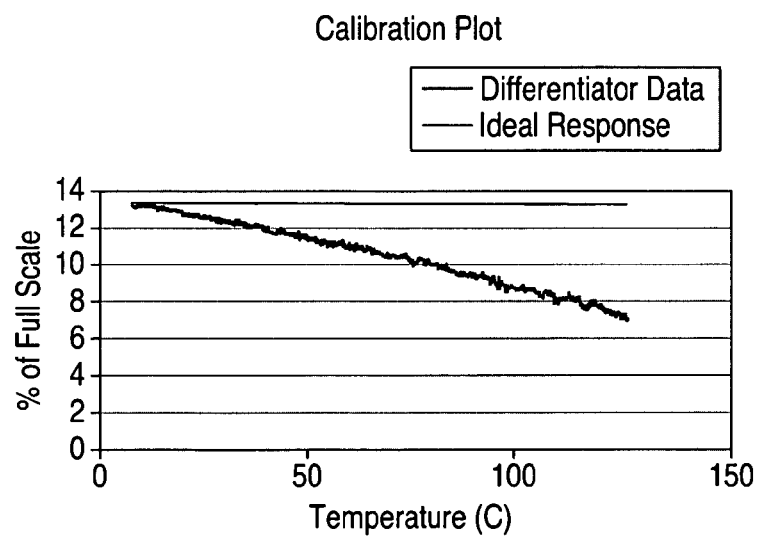
FIG. 7 is a graph of differentiator data and absorber temperature collected at low power and used for calibrating the laser power meter of the present invention.

To derive these coefficients, we start with FIG. 7, which shows the differentiator signal plotted with an ideal (constant) response versus absorber temperature. From FIG. 7 we can see that the error in the data is the difference between the ideal response and the differentiator data.

We can use numerical methods to fit the differentiator data to an equation of the form:

$$f(T) = a + b \cdot T^y$$

We will postulate a power equation of the form:

$$\text{Power}(T) = A \cdot \text{Differentiator\_Data} + (B \cdot T)^y$$

Looking at FIG. 7, we can see that the loss terms ($b \cdot T^y$ or $(B \cdot T)^y$) of the power equations are zero at the lowest temperature, and at maximums at the highest temperature.

The ideal value for the measured power is the power of the calibration laser beam, or $P_{ref}$. At the lowest temperature, the values of the equations are:

$$f(T_{low}) = a \quad \text{Power}(T_{low}) = A \cdot \text{Differentiator\_Data} = P_{ref}$$

At the highest temperature, the loss terms in the two equations are given by:

$$f_{loss}(T_{high}) = b \cdot T^y \quad \text{Power}_{loss}(T_{high}) = (B \cdot T)^y$$

To set the terms equal we must convert each to power. The equation on the right is already there, the first becomes:

$$\text{Power}_{loss}(T_{high}) = b \cdot T^y \cdot \frac{P_{ref}}{a}$$

We can equate the like terms and solve for A, B, and y in terms of the fitting equation's coefficients and the reference calibration power. The results are:

$$A = \frac{P_{ref}}{a} \quad B = \left(\frac{P_{ref} \cdot b}{a}\right)^{\frac{1}{y}}$$

If we perform a curve fit for a set of low power data and a set of high power data, we find that the value of A for both sets is constant to within a few hundredths of a percent. The values for B and y are strong functions of power. Since there are only two data points, the high power one and the low power one, we can do a linear fit of B and y. After the fit the coefficients will be:

$$B = B0 + B1 \cdot \text{Power}$$

$$y = B2 + B3 \cdot \text{Power}$$

$$A = \frac{A_{low} + A_{high}}{2}$$

Calibration Example

During calibration, differentiator (dT/dt) and absorber temperature (T) data is acquired both for minimum and maximum laser power exposures. For a 100 W laser power meter, data would be taken at about 10 W and about 100 W. First the laser power meter 10 is connected to a computer via a serial interface in the computation and readout unit 24. The computer assists with data recording and processing. The laser power meter 10 is exposed to maximum and minimum laser power until it reaches maximum temperature (150° C.). Between exposures the absorber is cooled back to room temperature. The two data sets are then curve fit to determine A, B0, B1, B2, and B3 using the previously outline curve fitting procedure. An example of the results of this procedure is:

| Low Power Data | High Power Data |
|---|---|
| $P_{ref}$ = 10.93 W | $P_{ref}$ = 94.6 W |
| A = 0.02628 | A = 0.02631 |
| B = 0.03382 | B = 0.02201 |
| y = 1.17 | y = 2.47 |
| A = 0.02629  B0 = 0.03536  B1 = 1.0002  B2 = 0.0155  B3 = −0.000141 | |

Calibrated Power Equations

The power to be displayed by the laser power meter 10 can be calculated using:

$$P_{est} = A \cdot \text{Differentiator\_Data} + (B0 \cdot T)^{B2} \quad \text{Equation 2.0}$$

$$\text{Power\_Percent} = \frac{A \cdot \text{Differentiator\_Data} + ([B0 + B1 \cdot P_{est}] \cdot T)^{[B2+B3 \cdot P_{est}]}}{100} \quad \text{Equation 3.0}$$

$$\text{Power} = \text{Power\_Percent} \cdot \text{LaserGage Range} \quad \text{Equation 4.0}$$

This method scales all power readings to 100 W. If the laser power meter 10 has a different range, then the readings will be computed and then scaled accordingly. This approach generalizes equations 1.0 and 1.1 to better scale the calibration constants for models having different maximum power. For example, if equation 3.0 yields 0.56, and the device is a 100 W model, the displayed power would be 100×0.56, or 56 W. For a 500 W model, the displayed power would be 500×0.56=280 W, and for a 3000 W model, the displayed power would be 3000×0.56=1680 W. In practice, the values of A, B0, B1, B2, and B3 are sent from the calibration computer to the computation and readout unit 24 during calibration as scaled integers, and without this normalization to 100 W, the values of the power coefficients would exceed 16 bit numbers. The table below shows scaling constants for the coefficients corresponding to different power capacities.

| Power Capacity | A | B0 | B1 | B2 | B3 |
|---|---|---|---|---|---|
| 100 W | 100,000 | 100,000 | 100,000 | 10,000 | 1,000,000 |
| 500 W | 20,000 | 20,000 | 20,000 | 2,000 | 200,000 |
| 3000 W | 3,333 | 3,333 | 3,333 | 333 | 33,333 |

Figure 8A:
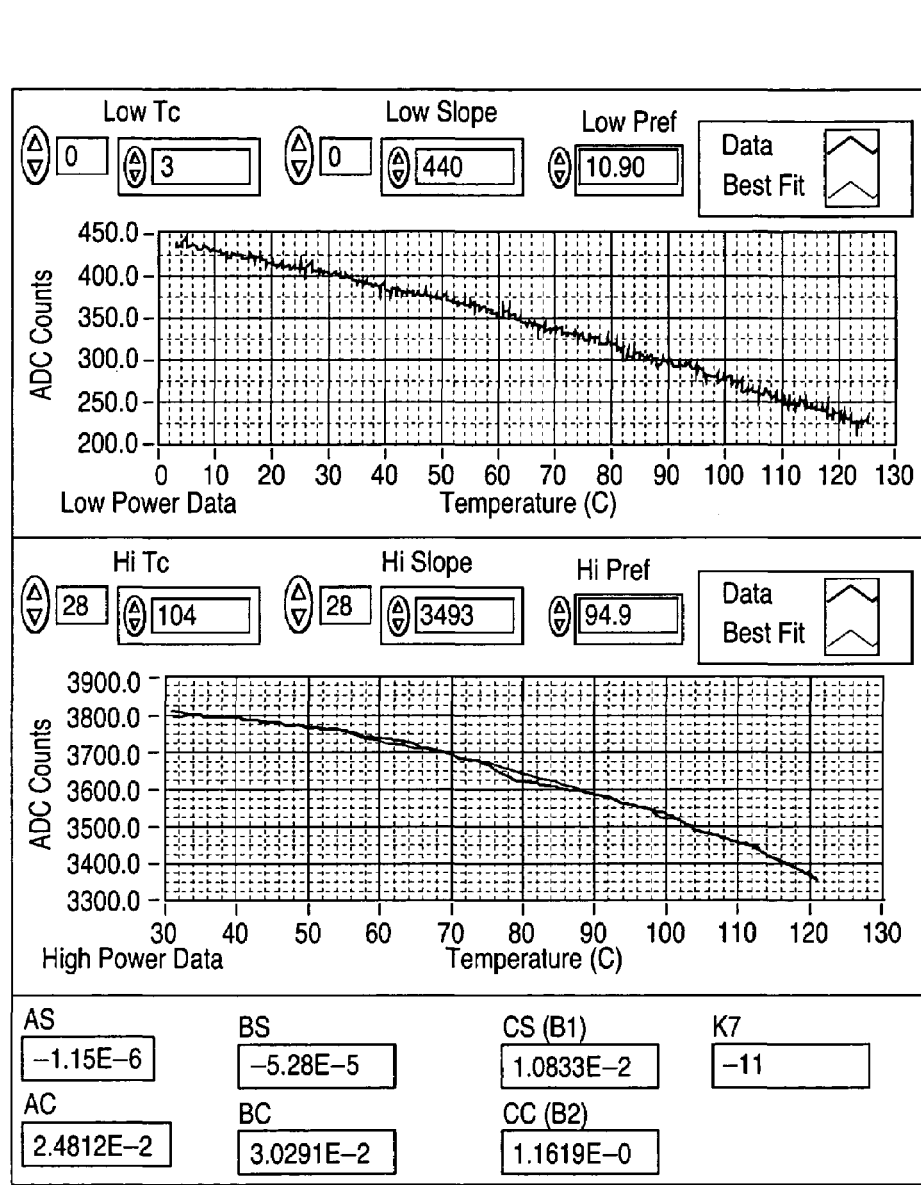
FIG. 8 includes two plots of differentiator data and absorber temperature at low and high power and two plots of computed power and temperature at low and high power.
Figure 8B:
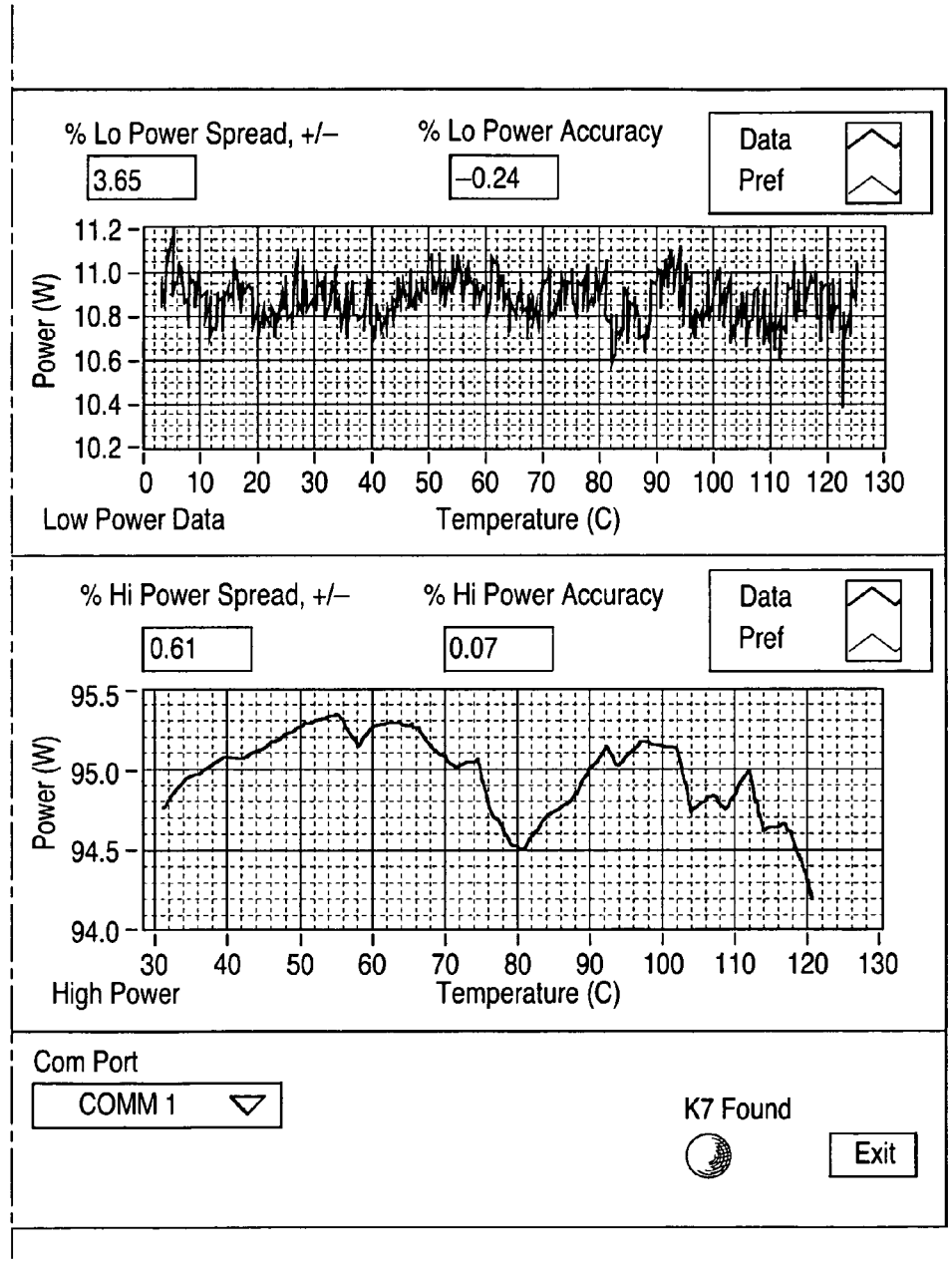

FIG. 8 shows a plot of calibration data taken from the calibration software. The two plots on the left show the raw data and the fitted curves to that data for lower power (upper) and high power (lower) calibrations. The plots on the right show the power calculated from the raw data using equations 2.0 and 3.0.

Figure 9:
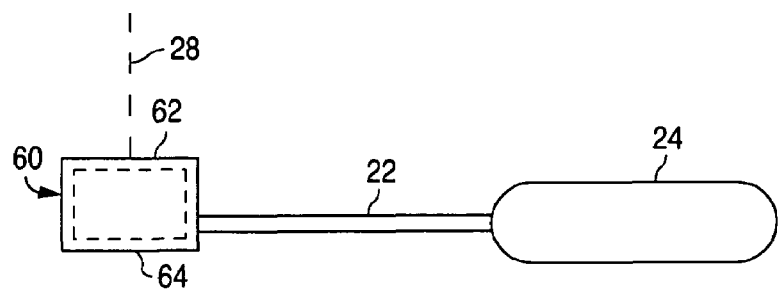
FIG. 9 is a side view of the laser power meter of the present invention with an alternative design for the absorber.
Figure 10:
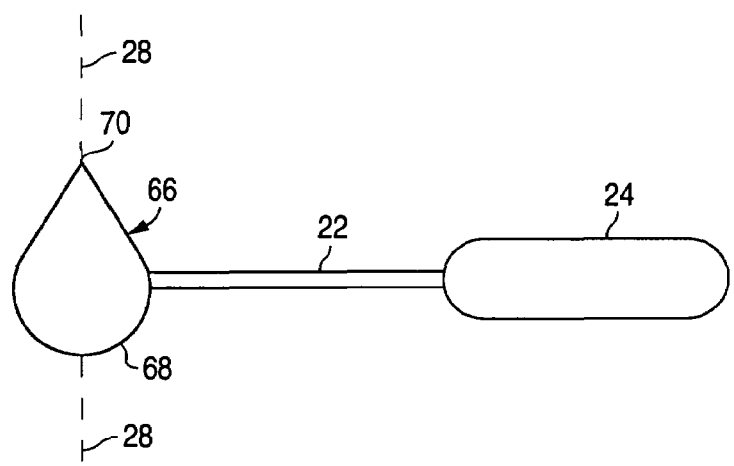
FIG. 10 is a side view of the laser power meter of the present invention with another alternative design for the absorber.
Figure 11:
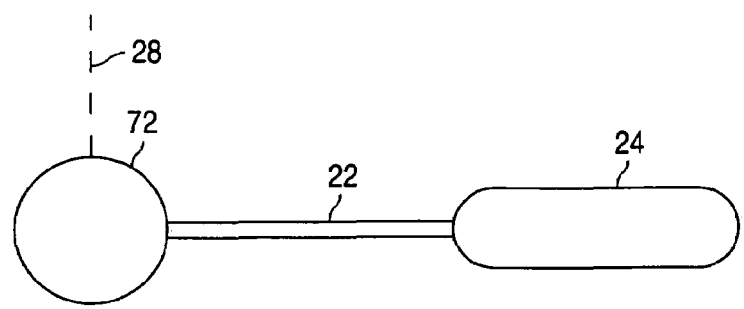
FIG. 11 is a side view of the laser power meter of the present invention with yet another alternative design for the absorber.

It has been found that the shape of the absorber 20 can affect performance. In particular, certain shapes tend to reduce measurement inaccuracies that can occur if the beam is not accurately centered on the absorber or if the beam is moved during the measurement. One preferred shape is the configuration illustrated in FIGS. 1 and 3, having a conical shape with a rounded tip at the apex and with the base of the cone joined to a short cylinder. In this configuration, the absorber 20 is preferably solid. As shown in FIG. 9, another possible shape for the absorber is a hollow cylinder 60, with the laser beam 28 impinging on one planar end face 62 and with the thermocouple coupled to the opposite planar end face 64. As shown in FIG. 10, a tear drop shape 66 is another alternative for the shape of the absorber, with the laser beam 28 impinging on either a rounded end 68 or a pointed end 70, and with the thermocouple positioned at the side opposite the laser beam. Still another possible shape is a sphere 72, shown in FIG. 11, either hollow or solid, with the thermocouple placed diametrically opposite the point where the laser beam 28 impinges.

From the above description, it will be apparent that the invention disclosed herein provides a novel and advantageous laser power meter and method for measuring power of a laser beam. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for measuring laser power with a meter having an absorber located in a path of a laser beam, said method comprising the steps of:
    monitoring both the temperature and the rate of change of temperature of the absorber as the laser beam heats up the absorber;
    computing an estimated power of the laser beam based on the monitored temperature and the rate of change of temperature of the absorber without considering power related loss effects; and then
    computing the power of the laser beam based on the estimated power determined in the previous step, and the temperature, the rate of change of temperature and power related losses of the absorber.

2. A method as recited in claim 1, further comprising the steps of repeatedly computing the power of the laser beam, averaging the computed power of the laser beam, and displaying an average power of the laser beam.

3. A method as recited in claim 1, further comprising a step of determining calibration constants for use in the computing steps.

4. A method as recited in claim 3, where the step of determining calibration constants includes collecting calibration data by directing a laser beam of known power onto the absorber and measuring the temperature and the rate of change of temperature of the absorber over a range of temperatures and thereafter directing a laser beam of a different known power onto the absorber and measuring the temperature and the rate of change of temperature of the absorber over a range of temperatures and thereafter curve fitting the calibration data to provide said calibration constants.

5. A method as recited in claim 4, wherein the calibration data is fit to the following equation:

$$P = A \cdot dT/dt + [(B0 + B1 \cdot P_{est})T]^{(B2+B3 \cdot P_{est})}$$

where P is the power of the laser beam, A is a sensitivity coefficient near room temperature, dT/dt is the rate of change of temperature of the absorber, $P_{est}$ is an estimated power of the laser beam without considering power related loss effects according to the formula $P_{est} = A \cdot dT/dt + [B0 \cdot T]^{B2}$, T is the temperature of the absorber, and B0, B1, B2 and B3 are loss coefficients.

6. A laser power meter comprising,
an absorber placed in a path of a laser beam during a power measurement;
a temperature sensor coupled to the absorber for measuring the temperature of the absorber;
a differentiator circuit coupled to the temperature sensor for determining a rate of change of the temperature of the absorber; and
a processor for computing an estimated power of the laser beam based on the measured temperature and rate of change of temperature of the absorber without considering power related loss effects, and for thereafter computing a power of the laser beam based on the estimated power and the temperature, the rate of change of temperature and power related losses of the absorber.

7. A laser power meter as recited in claim 6, further comprising means for repeatedly computing the power of the laser beam and then averaging the computed power of the laser beam and displaying an average power of the laser beam.

8. A laser power meter as recited in claim 6, further comprising means for determining calibration constants for use in computing the estimated power and power of the laser beam.

9. A laser power meter as recited in claim 8, wherein the means for determining calibration constants includes means for collecting calibration data by directing a laser beam of known power onto the absorber and measuring the temperature and the rate of change of temperature of the absorber over a range of temperatures and thereafter directing a laser beam of a different known power onto the absorber and measuring the temperature and the rate of change of temperature of the absorber over a range of temperatures and thereafter curve fitting the calibration data to provide said calibration constants.

10. A laser power meter as recited in claim 9, wherein the means for determining calibration constants includes means for fitting the calibration data to the following equation:

$$P = A \cdot dT/dt + [(B0 + B1 \cdot P_{est})T]^{(B2 + B3 \cdot P_{est})}$$

where P is the power of the laser beam, A is a sensitivity coefficient near room temperature, dT/dt is the rate of change of temperature of the absorber, $P_{est}$ is an estimated power of the laser beam without considering power related loss effects according to the formula $P_{est} = A \cdot dT/dt + [B0 \cdot T]^{B2}$, T is the temperature of the absorber, and B0, B1, B2 and B3 are loss coefficients.

11. A laser power meter as recited in claim 6, wherein the absorber has a shape of a hollow cylinder, and wherein the laser beam impinges on a planar end face of the cylinder.

12. A laser power meter as recited in claim 6, wherein the absorber has a shape of a tear drop having a rounded end and a tapered end ending in a tip, and wherein the laser beam impinges on the rounded end of the tear drop.

13. A laser power meter as recited in claim 6, wherein the absorber has a shape of a sphere, and wherein the laser beam impinges on a surface of the sphere.

* * * * *